T. B. CROWE.
PROCESS OF AND APPARATUS FOR PRECIPITATING MATERIALS FROM SOLUTIONS.
APPLICATION FILED JULY 3, 1916.
1,281,249.
Patented Oct. 8, 1918.
3 SHEETS—SHEET 3.
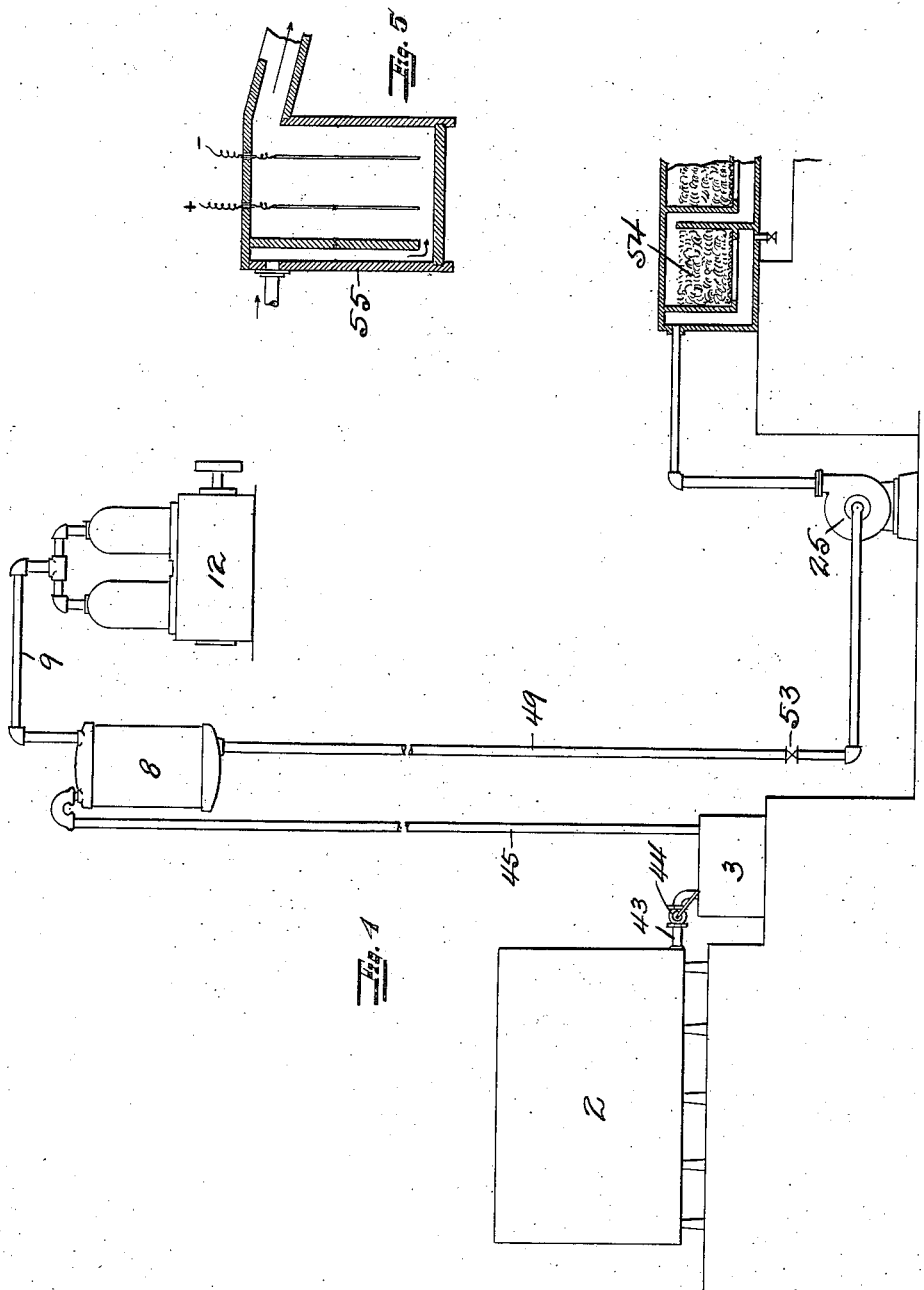
WITNESSES:
INVENTOR.
T. B. CROWE
BY
HIS ATTORNEYS.

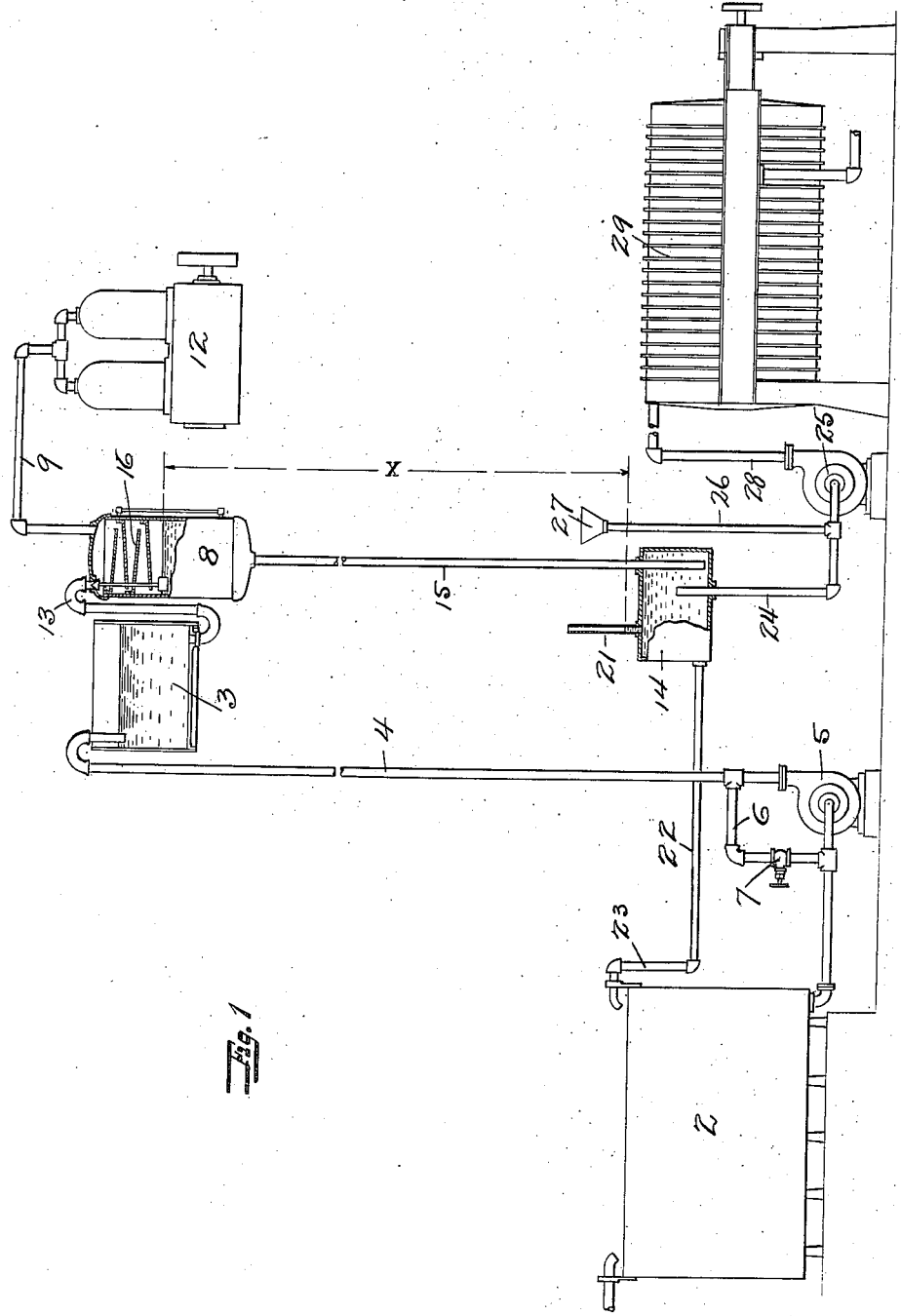

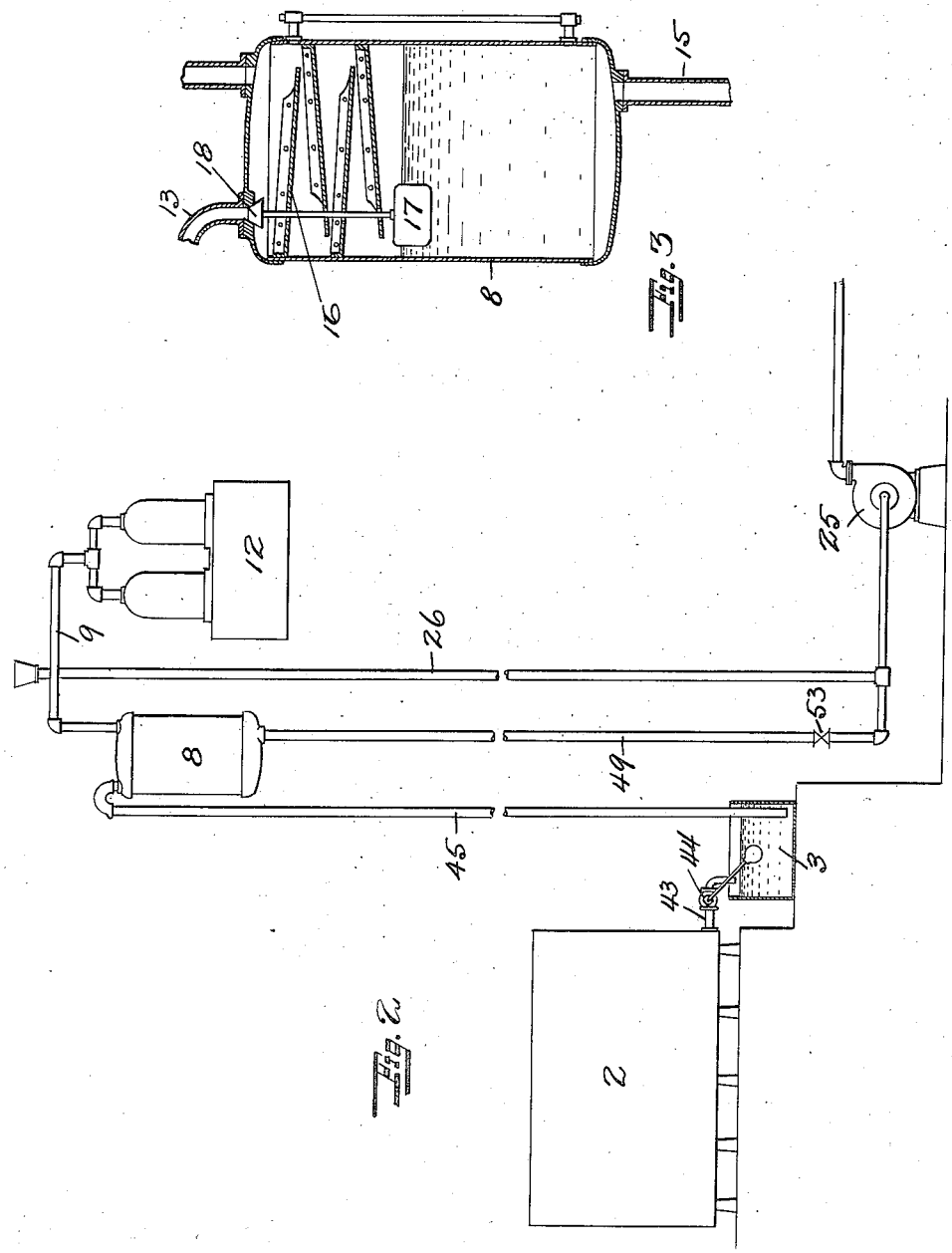

UNITED STATES PATENT OFFICE.

THOMAS B. CROWE, OF VICTOR, COLORADO, ASSIGNOR TO MERRILL METALLURGICAL COMPANY, OF SAN FRANCISCO, CALIFORNIA, A CORPORATION OF CALIFORNIA.

PROCESS OF AND APPARATUS FOR PRECIPITATING MATERIALS FROM SOLUTIONS.

1,281,249.  
Specification of Letters Patent.  
Patented Oct. 8, 1918.

Application filed July 3, 1916. Serial No. 107,317.

*To all whom it may concern:*

Be it known that I, THOMAS B. CROWE, a citizen of the United States, and a resident of Victor, county of Teller, State of Colorado, have invented a new and useful Process of and Apparatus for Precipitating Materials from Solutions, of which the following is a specification.

My invention relates to an improved process of and apparatus for precipitating and recovering valuable metal bearing material from solutions and particularly metals from hydrometallurgical solutions.

An object of the invention is to provide a process and apparatus for accomplishing the precipitation and recovery of materials from solutions and particularly metals from hydrometallurgical solutions, more efficiently and economically than heretofore. When metals or materials are precipitated from solutions by a precipitant having the quality of displacing from the solution that certain metal or material which it is desired to recover, and preferably comprising a metal capable of precipitating the desired metal from solution by replacement, it has been found that the contact of the air or other oxidizing gases with the mixture of solution and precipitant oxidizes the precipitate and the precipitant. This oxidization decreases the efficiency of precipitation and increases the cost of the precipitant, as that portion of the latter which is oxidized is unavailable for future precipitation. I have found that any tendency to oxidation during the process is deleterious to such an extent that precipitation may not only be incomplete, but a re-solution of the valuable metals previously precipitated and collected may occur. Heretofore, it has been the practice to precipitate the metals or material from the solution, with the solution in the condition in which it is discharged from the filter, leaching vats or other apparatus in which the metals or materials have been dissolved. When precipitants have been employed to replace the metals or materials, the precipitant has been added to the solution and the mixture conveyed without rest and without contact with the air to a filter, wherein the liquid is separated from the solid and semi-solid material, or the solution has been conducted through a container in which the precipitant is held, such as a zinc box containing zinc in percolable form through which the solution flows, for precipitating the metals from cyanid solution or a trough or tank containing iron for precipitating copper from copper bearing solutions. Precipitation is also accomplished by passing the solution through a vessel between an anode and a cathode, precipitation being accomplished by an electric current generated outside the cell. In all of these instances however, the precipitating action has taken place with the solution in the condition in which it is discharged from the filter, leaching vat or other apparatus. These solutions contain air or other oxidizing gases entrained in them and this entrained air or gas produces a deleterious effect on the precipitating process. By the expression entrained air I mean not only air which is physically held in the solution but also air which is dissolved in the solution. My invention contemplates the removal of entrained air or other oxidizing gases from the solution, for the purpose of overcoming the deleterious effect thereof on the precipitating action. The entrained air or gases may be removed in many ways and I do not desire to limit myself to any particular method of accomplishing their removal. Substantially all of the gases may be removed by subjecting the solution to the action of a vacuum, preferably accompanied by agitation, or in certain instances may be removed by adding a reducing agent, or chemical, such as sodium sulfid, hydrogen, etc. The entrained air or gases may be removed prior to or during the precipitating action and when a precipitant is employed, the air or gases are preferably removed prior to or during the time at which the precipitant is added, although results better than those obtained in the practice as heretofore employed may be obtained in some instances, by removing the air or gases after the precipitant has been added. I prefer, however, to remove the entrained air or gases from the solution prior to the addition of the precipitate thereto, so that the reducing conditions maintained throughout the precipitation process are maintained at a maximum. Since air is a gas, I shall hereinafter use the expression entrained gases, instead of entrained air and gases.

The invention possesses other advantageous features, some of which, with the foregoing, will be set forth at length in the following description where I shall outline in full one form of the process and those forms of the apparatus which are illustrated in the drawings accompanying and forming part of the present specification. In the specification I shall describe only one specific form of the process of my generic invention and several specific forms of the apparatus of my invention, but it is to be understood that I do not limit myself to such forms because my invention may be embodied in a multiplicity of forms, each being a species of my said invention. It is also to be understood that by the claims succeeding the description of my invention, I desire to cover the invention claimed in whatever form it may be embodied.

In the specification, I shall describe the invention in connection with the cyanid process for the recovery of gold, but it is to be understood that the invention is capable of general application. In accordance with my invention, the pregnant cyanid solution is preferably first treated to partly or wholly remove the entrained gases and the gas impoverished solution is then brought into contact with a precipitant capable of precipitating the desired metal from the solution by replacement. The precipitant may be added to the solution as heretofore described, or the solution may be flowed in contact with the precipitant. Various forms of apparatus may be employed for carrying out the process and in the drawings I have shown several forms in which entrained gases are removed by subjecting the solution to the action of a vacuum, but it is to be understood that the process is in no manner limited in its use to the forms of apparatus shown.

Referring to the drawings:

Figure 1 is an elevation of one form of the apparatus of my invention, parts of the conductors being broken away to reduce the size of the figure, and portions of the apparatus being broken away so that its operation may be more easily understood.

Fig. 2 is an elevation of a modified form of the apparatus shown in Fig. 1.

Fig. 3 is a section through the vacuum chamber of my apparatus, showing the baffle plates and float valve arranged therein.

Fig. 4 is an elevation of another form of the apparatus in which the solution is flowed through a trough or container in which the precipitant in a filiform or percolable condition is held.

Fig. 5 is an elevation of an electrolytic cell which may be substituted for the trough shown in Fig. 4, when the precipitation is to be accomplished by an electric current from an exterior source.

When entrained gases in the solution are to be removed by a vacuum or reduction of pressure, the desired condition of vacuum may be produced in several ways and in the accompanying drawings I have shown it as being produced by an air pump in an elevated tank or chamber, the outlet of which extends downward a sufficient distance to seal the vacuum which is produced in the chamber. Elevated above the main storage or supply tank 2 which contains the pregnant solution with its entrained gases, in the arrangement shown in Fig. 1, is a small feed tank 3 to which the solution is pumped from the tank 2 through the conductor 4 by the pump 5. A by-pass 6 around the pump, provided with a valve 7 permits the quantity of solution being delivered to the tank 3 to be regulated. By opening the valve 7 the solution is circulated through the by-pass 6 and pump 5 instead of being forced upwardly into the tank 3 against the head of solution in the conductor 4. The pump 5 is driven at a constant speed and the valve 7 adjusted so that the required quantity of solution is delivered to the tank 3.

Adjacent the feed tank 3 is a closed chamber 8 connected at its top by means of the conductor 9 with the vacuum pump 12 which may be of any suitable type. A conductor 13 also connects the top of the chamber 8 with the bottom of the feed tank 3 so that the solution in the tank, upon entering the conductor 13, will form a liquid seal between the feed tank and the chamber. Another tank 14 is arranged below the chamber 8 and solution flowing from the chamber 8 through the conductor 15 discharges adjacent the bottom of the receiving tank. The chamber 8 is spaced above the tank 14 such a distance that the weight of the column of solution lying between the levels of solution in the tank and the chamber, which is indicated on the drawing by the dimension "$x$" will exceed the degree of exhaustion maintained in the chamber 8 by the action of the vacuum pump 12; that is, the chamber 8 is raised above the tank 14 so that the height of column "$x$" is approximately 22 to 32 feet according to the efficiency of the vacuum pump, so that the solution will discharge constantly from the chamber 8 into the receiving tank 14 against the upward suction caused by the vacuum. In starting, a quantity of solution is placed in the tank 14 to seal the end of the conductor 15. With the exhaustion of the air from chamber 8, the unbalanced pressure of the atmosphere upon the solution in the feed tank 3 forces solution through the conductor 13 into the chamber 8 from which it discharges to the tank 14 through the conductor 15 by reason of the weight of the column of liquid in that conductor which is greater than the vacuum in chamber 8 can sustain. Preferably baffle plates 16 are arranged in the vacuum chamber 8 so that the incoming solution is spread out thereon in thin sheets. The action of the vacuum on the solution in the chamber 8 is to withdraw entrained gases therefrom, and dividing the incoming solution so that it is thoroughly exposed tends toward the substantially complete exhaustion of all of the entrained gases in the solution.

Chamber 8 is also preferably provided with a float valve as shown in Fig. 3. When the solution in the chamber reaches a certain maximum height the float 17 seats the valve 18 in the discharge opening of the conductor 13 and prevents a further inflow of solution until the level falls. It is understood however, that during the operation of the apparatus, the solution continually flows through the conductor 15, although the flow into the receiver may be interrupted by the valve.

Connected to the receiving tank 14, into which the gas impoverished solution is discharged, and preferably at the bottom thereof, is an overflow pipe 22 having an upward extension 23 discharging into the main tank 2. The extension 23 extends above the top of the tank 14 so that the tank is maintained full of solution. The tank 14 is provided with a short stand pipe 21 which extends above the extension 23 and the solution usually stands in the stand-pipe, where a very small area is exposed to the air and thereby any appreciable re-absorption of air by the solution is prevented.

A conductor 24 leads from the receiving tank 14 to a pump 25 preferably a triplex pump and means are provided for adding a precipitant to the solution as it flows from the tank 14 to this pump. Rising from the conductor 24 to a point above the level of the solution in the tank 14 is a pipe or conductor 26, into the upper end 27 of which is fed the precipitant in the form of an emulsion or in a dry state, as preferred.

As the solution is drawn through the conductor 24 the precipitant from the pipe 26 is mingled with it and the mixture forced without pause or rest and without contact with the air through the conductor 28 to the filter 29 where the solids are separated from the liquid.

Another embodiment of my invention is illustrated in Fig. 2, in which the feed tank 3' is located below the main supply tank 2. A pipe 43 equipped with a float valve 44 permits a certain maximum quantity of solution to flow into the feed tank and maintains the level thereof substantially constant. A conductor 45 connects the feed tank with the top of the vacuum chamber 8, the lower end of the conductor opening adjacent the bottom of the tank. The vacuum chamber 8 is located some distance above the feed tank 3', but is close enough so that the atmospheric pressure on the solution in the tank 3' will force solution upwardly through the conductor 45 into the chamber when the air in the latter is exhausted.

A vacuum pump 12 exhausts the air from the chamber 8 which causes solution from the tank 3' to flow into the chamber where the entrained gases are released from the solution as previously explained. The solution, exhausted of its entrained gases, is discharged from the chamber 8 through the conductor 49 which extends downwardly below the tank 3' such a distance that the head of solution in the chamber 8 and conductor 49 is preferably greater than or at least equal to that which the vacuum in the chamber 8 will sustain, so that the solution enters the pump preferably at some pressure in the direction of flow, thereby preventing air from being drawn into the pump at the bearings. After leaving the chamber 8 a precipitant is added to the solution by means of the pipe 26 extending upwardly from the conductor 49 to a point above the level of the solution in the chamber 8. The precipitant in any preferred form flows through the conductor 26 and mingles with the stream of solution passing through the conductor 49 and the mixture is forced by the pump 25 without rest and without contact with the air to the filter where the solids are separated from the liquid.

A valve 53 near the bottom of the conductor 49 permits the conductor and the chamber 8 to be sealed when the apparatus is to be started. After a quantity of solution has accumulated in the conductor 49 and the chamber 8, the valve 53 is opened and the solution continues to flow through the chamber 8.

In Fig. 4 I have shown a form of apparatus in which the gas impoverished solution is flowed through a conduit or container in which the precipitant preferably in the form of a spongy, percolable mass is held. The major portion of the apparatus is the same as that shown in Fig. 2, but instead of providing means for adding a precipitant to the solution, the solution is flowed from the pump 25 into a trough or container 54 in which the precipitant is held. This trough may assume the form of the ordinary zinc boxes when cyanid solution is being acted on, or any other well known form of precipitating box or cone, but it is preferably covered and kept full of solution to prevent the entrance of air thereto.

In Fig. 5, I have shown diagrammatically an electrolytic precipitation cell 55 through which the solution is flowed after entrained gases have been removed therefrom. In the electrolytic precipitating process this cell or a series of such cells, is substituted for the precipitant container 54. The cell is preferably covered to prevent the entrance of any material amount of air, but must be left sufficiently open to permit the escape of the gases produced by the passage of the current. In this construction, as in the construction shown in Fig. 4, the pump 25 may be dispensed with and the electrolytic cell or the precipitant container arranged at such level that the solution will flow thereto under the action of gravity.

My invention is by no means limited to the particular embodiments which I have described in detail for purposes of illustration. The apparatus in which the process is conducted may be entirely changed without departing from the invention, and the process itself may be modified, as for example, by removing the entrained gases during or simultaneously with the precipitation instead of prior thereto as in the embodiments illustrated.

I claim:

1. The process of precipitating material from its solution which consists in removing from the solution gas which interferes with the precipitation and precipitating the material therefrom.

2. The process of precipitating material from its solution which consists in removing oxidizing gases from the solution and precipitating the material from said gas impoverished solution.

3. The process of precipitating material from its solution which consists in removing entrained gases from the solution and precipitating the material therefrom while maintaining the solution out of contact with the atmosphere.

4. The process of precipitating material from its solution which consists in subjecting the solution to a vacuum and precipitating the material from the solution.

5. The process of precipitating material from its solution which consists in subjecting the solution to a vacuum and precipitating the material therefrom while maintaining the solution out of contact with the atmosphere.

6. The process of precipitating material from its solution which consists in removing oxidizing gases from the solution and flowing the solution into contact with a precipitant capable of displacing the material from the solution.

7. The process of precipitating material from its solution which consists in subjecting the solution to a vacuum and subsequently precipitating the material therefrom by contact between the solution and a precipitant.

8. The process of precipitating and recovering material from its solution which consists of removing entrained gases from the solution, adding a precipitant to the solution and conducting the mixture without contact with the air to a filter.

9. The process for precipitating and recovering material from its solution which consists in removing entrained gases from the solution, adding a precipitant to the duct through which said solution is being conveyed to a filter and separating the solid from the liquid in said filter.

10. The process for precipitating and recovering material from its solution which consists in removing entrained gases from the solution, adding a precipitant to said solution in motion, coveying the mixture to a filter and separating the solid from the liquid in said filter, all the while excluding the mixture from contact with the atmosphere.

11. The process of precipitating and recovering material from its solution which consists of subjecting the solution to a vacuum, adding a precipitant to the solution and conducting the mixture without contact with the air to a filter.

12. The process of precipitating material from its solution which consists of flowing the solution in thin sheets in a vacuum and precipitating the material therefrom by contact between the solution and a precipitant.

13. The process of precipitating and recovering material from its solution which consists of flowing the solution in thin sheets while subjecting it to a vacuum, adding a precipitant to the solution, conducting the solution without contact with oxidizing gases to a filter, and separating the solid from the liquid in said filter.

14. In an apparatus for precipitating material from its solution, a closed chamber receiving the solution, and means for creating a vacuum in said chamber to remove from the solution gases which interfere with precipitation.

15. In an apparatus for precipitating material from its solution, a filter, a conduit for solution connected to said filter, means connected in said conduit for removing from the solution gases which interfere with precipitation and means for bringing a precipitant into contact with said gas impoverished solution.

16. In an apparatus for precipitating material from its solution, means for removing gas which interferes with precipitation from the solution and a precipitant containing chamber receiving the solution.

17. In an apparatus for precipitating material from its solution, a conductor including a closed chamber through which the solution passes and means for creating a vacuum in said chamber.

18. In an apparatus for precipitating material from its solution, a conductor including a closed chamber through which solution passes, baffle plates in said chamber and means for creating a vacuum in said chamber.

19. In an apparatus for precipitating material from its solution, a conductor for conveying the pregnant solution, a chamber inserted in the conductor, means in said chamber for finely dividing the incoming solution, and means for exhausing entrained gases from the solution and means for bringing a precipitant into contact with said gas impoverished solution.

20. In an apparatus for precipitating material from its solution, a conductor for conveying the pregnant solution, a chamber inserted in said conductor, means for exhausting entrained gases from the solution as it passes through the chamber, and a float valve in said chamber and means for bringing a precipitant into contact with the gas impoverished solution.

21. In an apparatus for precipitating material from its solution, a feed tank, means for supplying said tank with solution to be treated, a closed chamber connected to said tank, means for exhausting air from said chamber, a tank connected to the chamber and arranged to receive solution therefrom, a conductor leading out of the receiving tank, means opening into said conductor for adding a precipitant to the solution therein and means inserted in said conductor for forcing the mixture of solution and precipitant through said conductor.

22. In an apparatus for precipitating material from its solution, a conductor for conveying the pregnant solution, a chamber inserted in the conductor, and means for creating a vacuum in said chamber, said chamber being elevated so that the head of liquid in the conductor discharging from the chamber exceeds the vacuum in the chamber.

23. In an apparatus for precipitating material from its solution, a conductor for conveying the pregnant solution, a chamber inserted in the conductor, a tank from which the conductor feeds solution to the chamber, and means for creating a vacuum in the chamber, the said feed tank being arranged so that the solution is forced therefrom into the said chamber by the unbalanced pressure of the air.

24. In an apparatus for precipitating material from its solution, a conductor for conveying the pregnant solution, a chamber inserted in the conductor, means for creating a vacuum in the chamber, a tank from which the solution is forced through said conductor to said chamber by unbalanced atmospheric pressure, and a tank inserted in said conductor for receiving the solution from the vacuum chamber, said receiving tank being spaced below said chamber so that the head of liquid in the conductor between the levels of the solution in the chamber and the receiving tank exceeds the vacuum in the chamber.

25. In an apparatus for precipitating material from its solution, a conductor for conveying the pregnant solution, a chamber inserted in the conductor, a tank from which the conductor feeds solution to said chamber, means opening in said conductor for adding a precipitant to the solution therein, and means for creating a vacuum in said chamber, said chamber being arranged above said receiving tank so that the head of liquid in the conductor between the levels of liquid in the chamber and the receiving tank exceeds the vacuum in the chamber.

26. The process of precipitating valuable metal from metal bearing cyanid solutions which consists in removing from the solution gases which interfere with precipitation and subsequently precipitating the valuable metal therefrom by contact of the solution with a finely divided metal capable of precipitating the valuable metal.

27. The process of precipitating valuable metal from metal bearing cyanid solutions which consists in removing oxidizing gases from the solution and consequently bringing the solution into contact with finely divided precipitant.

28. The process of precipitating valuable metal from metal bearing cyanid solutions which consists in subjecting the solution to the action of a vacuum for removing gases which interfere with precipitation and subsequently bringing the solution into contact with a finely divided metal capable of precipitating the valuable metal from solution.

29. The process of precipitating valuable metal from metal bearing cyanid solutions which consists in removing from the solution gases which interfere with precipitation and subsequently precipitating the valuable metal therefrom by flowing the solution in contact with a metal capable of precipitating the valuable metal from solution.

30. The process of precipitating valuable metal from metal bearing cyanid solutions which consists in subjecting the solution to the action of a vacuum for removing gases which interfere with precipitation and subsequently flowing the solution in contact with a metal capable of precipitating the valuable metal from solution.

31. The process of precipitating valuable metal from metal bearing cyanid solutions which consists in removing from the solution gases which interfere with precipitation and subsequently precipitating the valuable metal therefrom by agitation in contact with a metal capable of precipitating the valuable metal from solution.

In testimony whereof, I have hereunto set my hand at Colorado Springs, Colorado, this 9th day of June, 1916.

THOMAS B. CROWE.

In presence of—
H. V. HOLMAN,
W. T. HAIR.